United States Patent
Park et al.

(10) Patent No.: US 12,087,291 B2
(45) Date of Patent: Sep. 10, 2024

(54) DIALOGUE SYSTEM, DIALOGUE PROCESSING METHOD, TRANSLATING APPARATUS, AND METHOD OF TRANSLATION

(71) Applicants: HYUNDAI MOTOR COMPANY, Seoul (KR); KIA CORPORATION, Seoul (KR)

(72) Inventors: Youngmin Park, Gunpo-si (KR); Seona Kim, Seoul (KR); Jeong-Eom Lee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 123 days.

(21) Appl. No.: 17/684,008

(22) Filed: Mar. 1, 2022

(65) Prior Publication Data
US 2022/0180864 A1   Jun. 9, 2022

Related U.S. Application Data

(62) Division of application No. 16/789,041, filed on Feb. 12, 2020, now Pat. No. 11,295,733.

(30) Foreign Application Priority Data

Sep. 25, 2019   (KR) .................. 10-2019-0118290

(51) Int. Cl.
*G06F 40/58* (2020.01)
*G10L 15/18* (2013.01)
*G10L 15/197* (2013.01)
*G10L 15/22* (2006.01)
*G10L 15/26* (2006.01)

(52) U.S. Cl.
CPC ............ *G10L 15/197* (2013.01); *G06F 40/58* (2020.01); *G10L 15/1822* (2013.01); *G10L 15/22* (2013.01); *G10L 15/26* (2013.01)

(58) Field of Classification Search
CPC ................................ G06F 40/58; G10L 15/18
See application file for complete search history.

(56) References Cited

U.S. PATENT DOCUMENTS

| | | | |
|---|---|---|---|
| 8,838,434 B1 * | 9/2014 | Liu | .......... G06F 40/58 704/7 |
| 2006/0184370 A1 | 8/2006 | Kwak et al. | |
| 2006/0235689 A1 | 10/2006 | Sugihara et al. | |
| 2013/0006637 A1 | 1/2013 | Kanevsky et al. | |

(Continued)

*Primary Examiner* — Jialong He
(74) *Attorney, Agent, or Firm* — Lempia Summerfield Katz LLC

(57) ABSTRACT

A translating apparatus includes: a translator configured to translate an input sentence of a first language into a second language to generate a plurality of output sentences; a first dialogue manager configured to generate a meaning representation for the input sentence of the first language; a second dialogue manager configured to generate a meaning representation for each of the plurality of output sentences of the second language; and a determiner configured to determine a final output sentence among the plurality of output sentences of the second language based on the meaning representation for the input sentence of the first language and the meaning representation for each of the plurality of output sentences of the second language.

8 Claims, 12 Drawing Sheets

(56) References Cited

U.S. PATENT DOCUMENTS

| | | | |
|---|---|---|---|
| 2013/0226553 A1* | 8/2013 | Ji | G06F 40/44 |
| | | | 704/2 |
| 2013/0268259 A1* | 10/2013 | Kim | G10L 15/22 |
| | | | 704/7 |
| 2014/0257794 A1 | 9/2014 | Gandrabur et al. | |
| 2014/0288946 A1* | 9/2014 | Shinohara | G06F 40/109 |
| | | | 705/2 |
| 2015/0340033 A1 | 11/2015 | Di Fabbrizio et al. | |
| 2016/0188565 A1 | 6/2016 | Robichaud et al. | |
| 2016/0247068 A1 | 8/2016 | Lin | |
| 2017/0060855 A1* | 3/2017 | Song | G06F 40/55 |
| 2017/0083510 A1* | 3/2017 | Dixon | G06F 40/44 |
| 2017/0199867 A1 | 7/2017 | Koji et al. | |
| 2018/0096680 A1 | 4/2018 | Lee et al. | |
| 2019/0122667 A1 | 4/2019 | Andersen et al. | |
| 2019/0171718 A1* | 6/2019 | Ishikawa | G06F 40/58 |
| 2019/0237068 A1 | 8/2019 | Canim et al. | |

\* cited by examiner

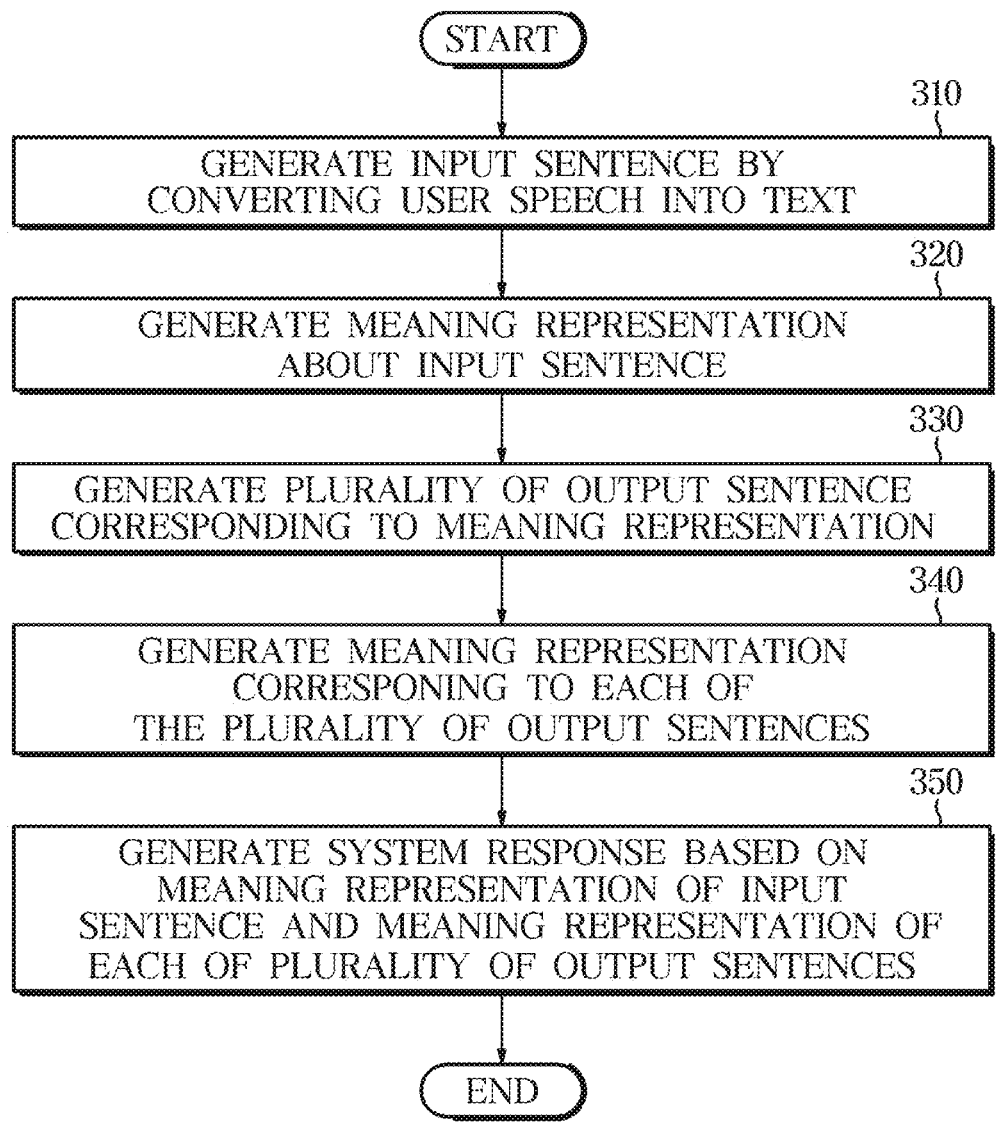

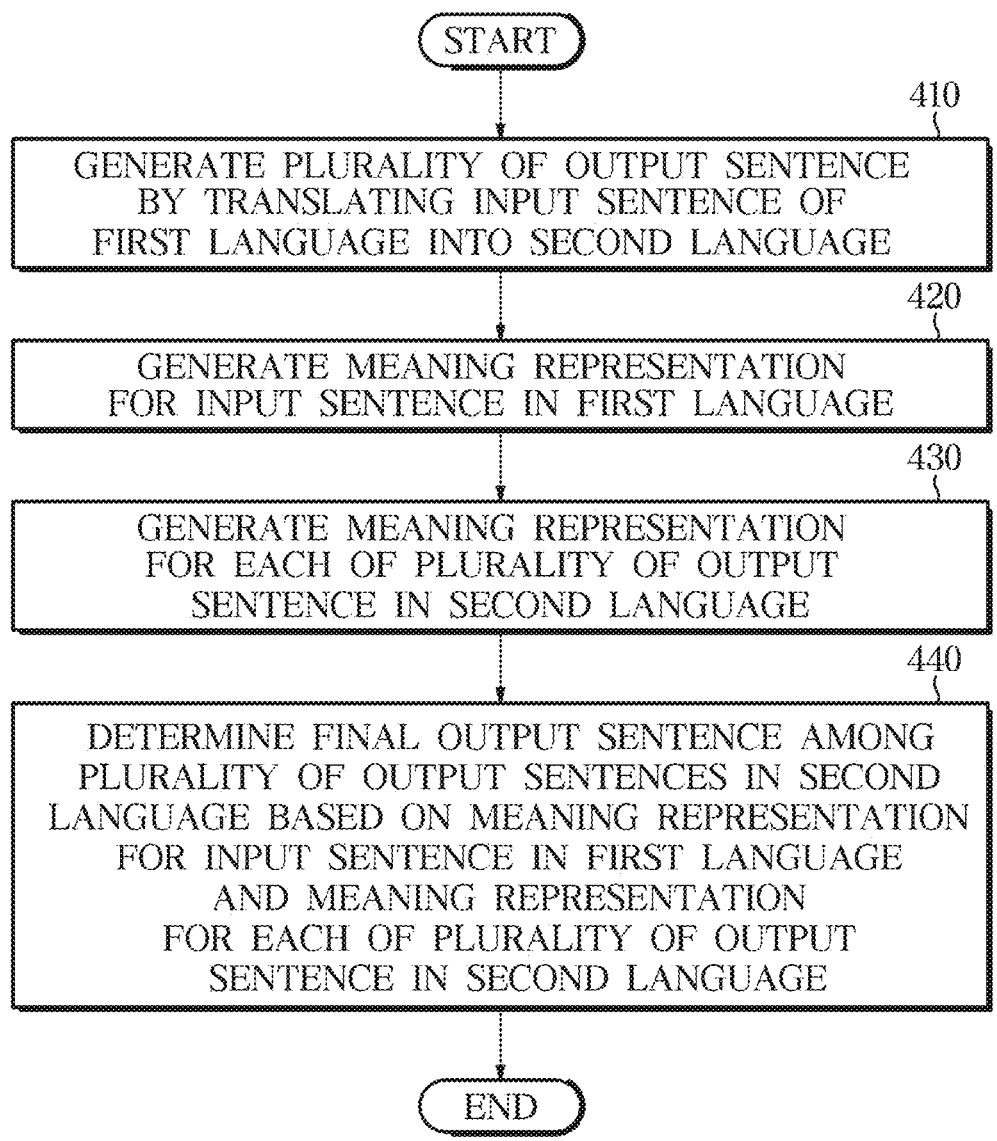

DIALOGUE SYSTEM, DIALOGUE PROCESSING METHOD, TRANSLATING APPARATUS, AND METHOD OF TRANSLATION

CROSS-REFERENCE TO RELATED APPLICATION

This application is a divisional of U.S. application Ser. No. 16/789,041 filed Feb. 12, 2020, which claims priority under 35 U.S.C. § 119 to Korean Patent Application No. 10-2019-0118290, filed on Sep. 25, 2019 in the Korean Intellectual Property Office, the disclosures of which are incorporated by reference herein in their entirety.

BACKGROUND

1. Technical Field

Embodiments of the present disclosure relate to a dialogue system, a dialogue processing method, a translating apparatus, and a translating method capable of outputting an input sentence by translating the input sentence into another language electronic apparatus capable of communicating with a user.

2. Description of Related Art

A dialogue system is a system that can recognize a user's speech and provide a service corresponding to the recognized speech.

The dialogue system may output a system response to provide a service corresponding to the recognized speech. The system response may include an answer to a user's question and may include a question to confirm the speech of the user or may include a guide to a service to be provided.

The system response output from the dialogue system allows the user to feel as if the user was having a real conversation, and to speak naturally as if the user was having a conversation with someone. Therefore, in evaluating the performance of the dialogue system, an important factor may be that the system response output from the dialogue system matches the user's speech.

SUMMARY

The disclosed embodiments provide a dialogue system and a dialogue processing method that can improve the accuracy and user convenience of the system response by generating a system response using a semantic analysis model used to analyze the meaning of the speech of a user.

In addition, the disclosed embodiments provide a translation apparatus and a translating method that can improve the accuracy of the translation by using a semantic analysis model used to analyze the meaning of the user's utterance when selecting the final output sentence from the plurality of output sentences translated from the input language to another language.

In accordance with embodiments of the disclosure, a dialogue system includes: a speech recognizer configured to generate an input sentence by converting a speech of a user into a text; a dialogue manager configured to generate a meaning representation for the input sentence; and a result processor configured to generate a plurality of output sentences corresponding to the meaning representation. The dialogue manager may generate a meaning representation for each of the plurality of output sentences. The result processor may generate a system response based on the meaning representation for the input sentence and the meaning representation for each of the plurality of output sentences.

Further, the result processor may determine a rank of the plurality of output sentences using a N-best algorithm.

Further, the result processor may determine the rank of the plurality of output sentences again based on a similarity degree between the meaning representation for the input sentence and the meaning representation for each of the plurality of output sentences.

Further, the result processor may assign a confidence score to each of the plurality of output sentences using the N-best algorithm.

Further, the result processor may assign a similarity score for each of the plurality of output sentences based on the similarity degree between the meaning representation for the input sentence and the meaning representation for each of the plurality of output sentences.

Further, the result processor may generate the system response based on a sum score that adds the confidence score and the similarity score.

In accordance with embodiments of the disclosure, a translating apparatus includes: a translator configured to translate an input sentence of a first language into a second language to generate a plurality of output sentences; a first dialogue manager configured to generate a meaning representation for the input sentence of the first language; a second dialogue manager configured to generate a meaning representation for each of the plurality of output sentences of the second language: and a determiner configured to determine a final output sentence among the plurality of output sentences of the second language based on the meaning representation for the input sentence of the first language and the meaning representation for each of the plurality of output sentences of the second language.

Further, the translator may determine a rank of the plurality of output sentences of the second language using a N-best algorithm.

Further, the determiner may determine the rank of the plurality of output sentences again based on a similarity degree between the meaning representation for the input sentence of the first language and the meaning representation for each of the plurality of output sentences of the second language.

Further, the translator may assign a confidence score to each of the plurality of output sentences of the second language using the N-best algorithm.

Further, the determiner may assign a similarity score for each of the plurality of output sentences of the second language based on the similarity degree between the meaning representation for the input sentence of the first language and the meaning representation for each of the plurality of output sentences of the second language.

Further, the determiner may determine a final output sentence based on a sum score that adds the confidence score and the similarity score.

In accordance with embodiments of the disclosure, a dialogue processing method includes: generating an input sentence by converting a speech of a user into a text; generating a meaning representation for the input sentence; generating a plurality of output sentences corresponding to the meaning representation for the input sentence; generating a meaning representation for each of the plurality of output sentences; and generating a system response based on the meaning representation for the input sentence and the meaning representation for each of the plurality of output sentences.

Further, generating the plurality of output sentences corresponding to the meaning representation may comprise determining a rank of the plurality of output sentences using a N-best algorithm.

Further, generating the system response may comprise, determining the rank of the plurality of output sentences again based on a similarity degree between the meaning representation for the input sentence and the meaning representation for each of the plurality of output sentences.

Further, generating a plurality of output sentences corresponding to the meaning representation may comprise, assigning a confidence score to each of the plurality of output sentences using the N-best algorithm.

Further, generating the system response may comprise, assigning a similarity score for each of the plurality of output sentences based on the similarity degree between the meaning representation for the input sentence and the meaning representation for each of the plurality of output sentences.

Further, generating the system response may comprise, determining a final output sentence based on a sum score that adds the confidence score and the similarity score.

In accordance with embodiments of the disclosure, a translating method includes: generating a plurality of output sentences by translating an input sentence of a first language into a second language; generating a meaning representation for the input sentence of the first language; generating a meaning representation for each of the plurality of output sentences of the second language; and determining a final output sentence among the plurality of output sentences of the second language based on the meaning representation for the input sentence of the first language and the meaning representation for each of the plurality of output sentences of the second language.

Further, generating the plurality of output sentences of the second language may comprise determining a rank of the plurality of output sentences of the second language using a N-best algorithm.

Further, determining the final output sentence may comprise determining the rank of the plurality of output sentences again based on a similarity degree between the meaning representation for the input sentence of the first language and the meaning representation for each of the plurality of output sentences of the second language.

Further, generating the plurality of the output sentences of the second language may comprise assigning a confidence score to each of the plurality of output sentences of the second language using the N-best algorithm.

Further, determining the final output sentence may comprise assigning a similarity score for each of the plurality of output sentences of the second language based on the similarity degree between the meaning representation for the input sentence of the first language and the meaning representation for each of the plurality of output sentences of the second language.

Further, determining the final output sentence may further comprise determining the final output sentence based on a sum score that adds the confidence score and the similarity score.

BRIEF DESCRIPTION OF THE DRAWINGS

These and/or other aspects of the disclosure should become apparent and more readily appreciated from the following description of embodiments, taken in conjunction with the accompanying drawings of which:

FIG. 11 is a flowchart of a dialogue processing method, according to an embodiment.

FIG. 12 is a flowchart of a translating method, according to an embodiment.

DETAILED DESCRIPTION OF THE EMBODIMENTS

Figure 1:
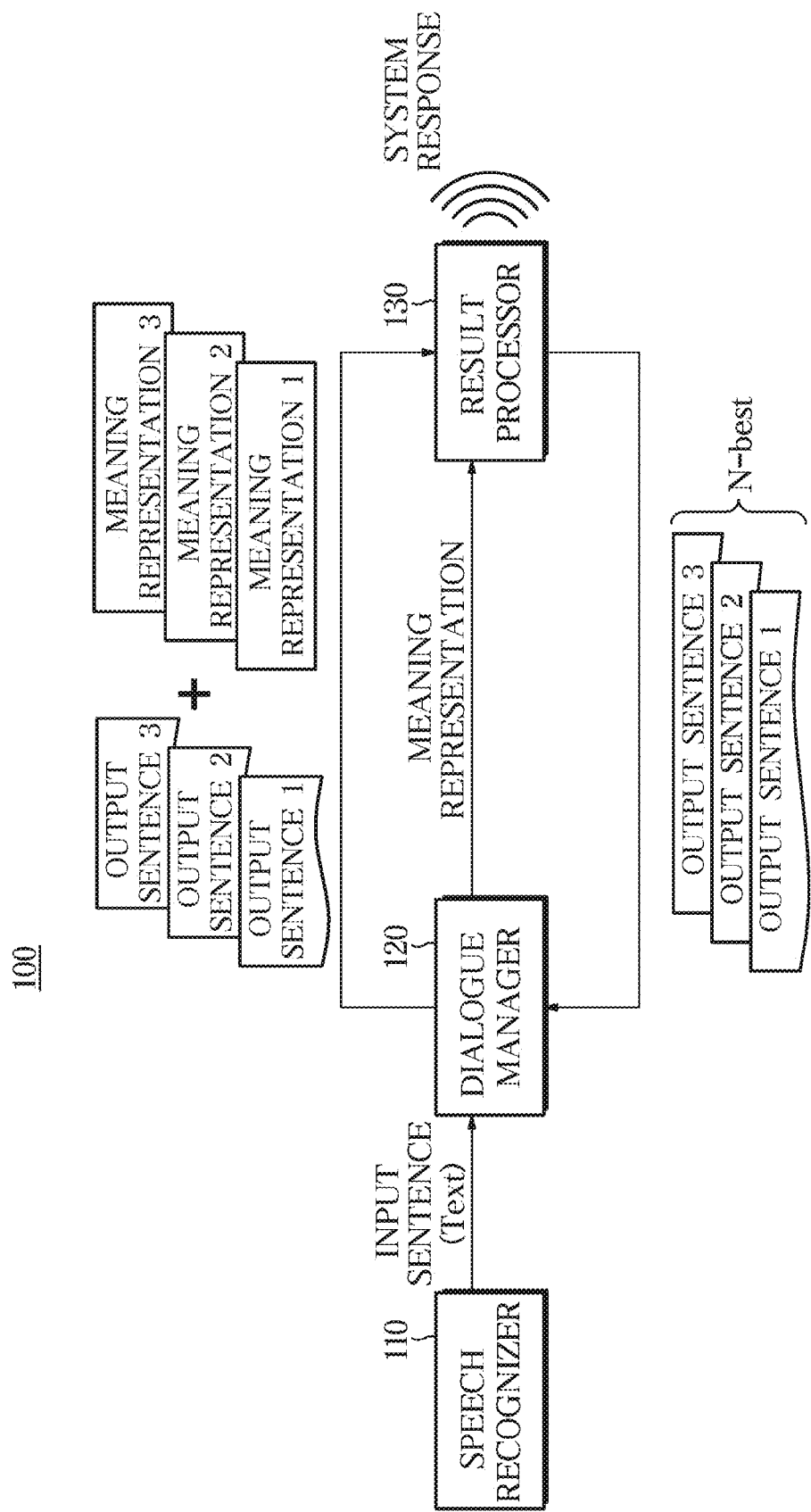
FIG. 1 is a control block diagram of a dialogue system according to an embodiment.

Configurations shown in the embodiments and drawings described herein are examples of the disclosure. There may be various modifications that can replace the embodiments and drawings of the present specification at the time of filing of the present application.

Also, the terminology used herein is for the purpose of describing particular embodiments only and is not intended to be limiting of the disclosure. Singular expressions include plural expressions unless the context clearly indicates otherwise. As used herein, the terms "comprise" or "have" are intended to designate that the features, numbers, steps, actions, components, parts, or combinations thereof described in the specification are present. The terms "comprise" or "have" do not preclude the existence or addition of one or more other features or numbers, steps, operations, components, parts or combinations thereof in advance.

In addition, terms such as "~ part", "~ group", "~ block", "~ member", "~ module" may refer to a unit for processing at least one function or operation. For example, the terms may refer to at least one hardware processed by at least one piece of hardware such as a field-programmable gate array (FPGA)/application specific integrated circuit (ASIC), at least one software stored in a memory, or a processor.

In addition, ordinal numbers such as "first" and "second" used before the components described herein are merely used to distinguish the components from each other. The order of connection between these components and the order of use thereof do not have a different SEMANTIC, such as priority.

The references attached to the steps are used to identify the steps. These references do not indicate the order between the steps. Each step may be performed in a different order than the stated order unless the context clearly indicates a specific order.

On the other hand, the disclosed embodiments may be implemented in the form of a recording medium for storing instructions executable by a computer. Instructions may be stored in the form of program code and, when executed by a processor, may generate a program module to perform the operations of the disclosed embodiments. The recording medium may be implemented as a computer-readable recording medium.

Computer-readable recording media may include all kinds of recording media having stored thereon instructions which can be read by a computer. For example, there may be a read only memory (ROM), a random access memory (RAM), a magnetic tape, a magnetic disk, a flash memory, an optical data storage device, and the like.

Hereinafter, an embodiment of a dialogue system, a dialogue processing method, and an electronic apparatus according to an aspect is described in detail below with reference to the accompanying drawings.

The dialogue system according to an embodiment is a system that can recognize a user's speech and provide a service corresponding to the recognized speech. The dialogue system may output a system response to provide a service corresponding to the recognized speech. The system response may include an answer to a user's question and may include a question to confirm a user's speech or may include a guide to a service to be provided.

FIG. 1 is a control block diagram of a dialogue system according to an embodiment.

Referring to FIG. 1, a dialogue system 100 according to an embodiment includes: a speech recognizer 110 that converts a user's speech into text and generates an input sentence; a dialogue manager 120 that generates a meaning representation for the input sentence; and a result processor 130 that generates a plurality of output sentences corresponding to meaning representations.

According to an embodiment, the dialogue system 100 may include at least one memory for storing a program and related data, and at least one processor for executing a stored program.

In this embodiment, the components are not classified based on physical location or configuration but based on operation. Each of the speech recognizer 110, the dialogue manager 120, and the result processor 130 can use separate memories and processors or it is also possible that some or all may share a memory and a processor.

According to an embodiment, the dialogue system 100 may be implemented as a server. In this case, the speech recognizer 110, the dialogue manager 120, and/or the result processor 130 of the dialogue system 100 may be provided in the server.

However, some of the components such as the speech recognizer 110, the dialogue manager 120, and/or the result processor 130 of the dialogue system 100 may be provided in a user terminal connecting the dialogue system 100 with the user.

For example, when the user terminal is a vehicle, some of the components of the dialogue system 100 may be provided in the vehicle. When the user terminal is a mobile device such as a smartphone, an artificial intelligence (AI) speaker or a personal computer (PC), some of the components of the dialogue system 100 may be provided in the mobile device, the AI speaker or the PC.

Alternatively, the user may download and use a program for performing some functions of the components of the dialogue system 100 on the user terminal.

The microphone and the speaker may be provided in a user terminal such as a vehicle, a mobile device, or a PC. The user terminal may be connected to the dialogue system 100 through wireless communication. Although not shown in the control block diagram of FIG. 1, the dialogue system 100 may further include a wireless communication module that may exchange data with the user terminal through wireless communication.

User speech input through the microphone may be transmitted to the wireless communication module of the dialogue system 100.

The speech recognizer 110 may convert speech into text by applying a speech recognition algorithm or STT (Speech to Text) to a user's speech. For example, by applying feature vector extraction techniques such as Cepstrum, Linear Predictive Coefficient (LPC), Mel Frequency Cepstral Coefficient (MFCC), or Filter Bank Energy, the speech recognizer 110 extracts the feature vector of the voice signal corresponding to the user's speech may be extracted.

The recognition result may be obtained by comparing the extracted feature vector with the trained reference pattern. To this end, an acoustic model for modeling and comparing signal characteristics of speech and a language model for modeling linguistic order relations such as words or syllables corresponding to a recognized vocabulary may be used.

The acoustic model may be further divided into a direct comparison method for setting a recognition object as a feature vector model and comparing it with a feature vector of speech data and a statistical method for statistically processing the feature vector of the recognition object.

The direct comparison method is a method of setting a unit of a word, a phoneme, or the like to be recognized as a feature vector model and comparing how similar the input speech is. According to the vector quantization method, a feature vector of input speech data is mapped with a codebook, which is a reference model, and encoded as a representative value, thereby comparing the code values.

The statistical model method is a method of constructing a unit for a recognition object into a state sequence and using a relationship between state columns. The status column may consist of a plurality of nodes. Methods using the relationship between the state columns again include dynamic time warping (DTW), hidden Markov models (HMM), and neural networks.

Dynamic time warping is a technique for compensating for differences in the time axis when considering the dynamic characteristics of speech whose length varies over time even when the same person pronounces the same pronunciation. The hidden Markov model or HMM assumes speech as a Markov process with state transition probabilities and observation probabilities of nodes (output symbols) in each state. The HMM then estimates the state transition probabilities and observation probabilities of the nodes from the training data. In the estimated model, the HMM calculates the probability that an input voice will occur as a recognition technique.

On the other hand, a language model for modeling linguistic order relations such as words or syllables may apply acoustic relations between units constituting the language to units obtained in speech recognition, thereby reducing acoustic ambiguity and reducing recognition errors. The linguistic model has a model based on a statistical language model and a finite state automata (FSA), and the statistical linguistic model uses a chain probability of words such as Unigram, Bigram, and Trigram.

The speech recognizer 110 may use any of the methods described above in recognizing and converting a voice signal corresponding to a user's speech into text. For example, an acoustic model with a hidden Markov model may be used, or a model that integrates the acoustic model and the speech model may be used.

The speech recognizer 110 converts a user's speech into text and inputs it into the dialogue manager 120. In the following embodiment, the user's speech that is converted into text is referred to as an input sentence.

The dialogue manager 120 may apply natural language understanding to the input sentence to determine the user's intention included in the user's speech. The entity name is a proper noun such as a person's name, place name, organization name, time, date, currency, and the like. The entity name recognition is the task of identifying the entity name in the sentence and determining the type of the entity name identified. By recognizing individual names, we can extract important keywords from sentences to understand the meaning of sentences.

The dialogue manager 120 may extract domains from the speech of the user. The domain can identify the subject of the language spoken by the user. For example, various domains such as text, navigation, schedule, weather, traffic information, vehicle control, and home appliance control can be predetermined. The dialogue manager 120 may determine which of the predetermined domains is the domain of user speech.

The dialogue manager 120 can analyze the speech acts of a user's speech. Speech act analysis is used to analyze the intention of the user's speech and to grasp the intention of the speech such as whether the user asks a question, makes a request, makes a response, or expresses a simple emotion.

The dialogue manager 120 may grasp the user's intention based on information on a domain, an entity name, a dialogue act, and the like corresponding to the user's speech, and extract an action corresponding to the user's intention. An action may be defined by an object and an operator.

For example, when the identified user intention is "run air conditioner", the corresponding action may be defined as "air conditioner(object)_ON (operator)", when the recognized user intention is "text sending", the corresponding action may be defined as "text(object)_send (operator)".

In addition, the dialogue manager 120 may extract factors related to performing an action. The factors associated with performing the action may be valid factors directly required to perform the action or may be invalid factors used to extract such valid factors.

For example, if the text output generated by the speech recognizer 110 is "Send Text to Gil-dong", then the dialogue manager 120 determines that the domain corresponding to the user's speech is "text", the action is "text send", and a speech act corresponds to a "request".

The object name "Gil-dong" corresponds to {Factor1: Recipient} related to performing the action. However, in order to actually send the text, {Factor2: specific Message Contents} is required.

In this case, the dialogue system 100 may output the system response "Please tell me the message to send" to obtain the specific message content from the user.

The dialogue manager 120 generates a meaning representation used to generate a system response corresponding to the user intention or to provide a service corresponding to the user intention in the result processor 130 based on the above-described text (input sentence) analysis result. The meaning representation in dialogue processing may be a result of natural language understanding or may be an input of natural language generation. For example, the dialogue manager 120 may analyze a user's speech to generate a meaning representation expressing the user's intention and generate a meaning representation corresponding to the next system speech in consideration of the dialogue flow and situation.

The result processor 130 may generate a sentence (hereinafter referred to as an output sentence) to be output as a system response based on the meaning representation output from the dialogue manager 120. The generated sentence may be synthesized into a voice signal by a text to speech (TTS) engine provided in the result processor 130 and output through a speaker provided in the user terminal.

The result processor 130 may generate an output sentence by applying a natural language generation technology and may generate a plurality of output sentences by applying an N-best algorithm.

When the result processor 130 generates three output sentences (output sentence 1, output sentence 2, and output sentence 3) based on the meaning representation of the input sentence, the three output sentences are inputted into the dialogue manager 120. The dialogue manager 120 may generate a meaning representation for each of the plurality of output sentences.

As described above, the dialogue manager 120 may apply a natural language understanding technique to analyze the meaning of the input sentence. The dialogue manager 120 may generate a meaning representation by analyzing the output sentence generated by the result processor 130 using the same technique.

The dialogue manager 120 may generate a meaning representation 1 for the output sentence 1, a meaning representation 2 for the output sentence 2, and a meaning representation 3 for the output sentence 3, respectively, and send the result to the result processor 130.

The result processor 130 may generate a system response based on the meaning representation of the input sentence and the meaning representation of each of the plurality of output sentences.

Hereinafter, a process of generating a system response by the result processor is described below in more detail with reference to FIG. 2.

Figure 2:
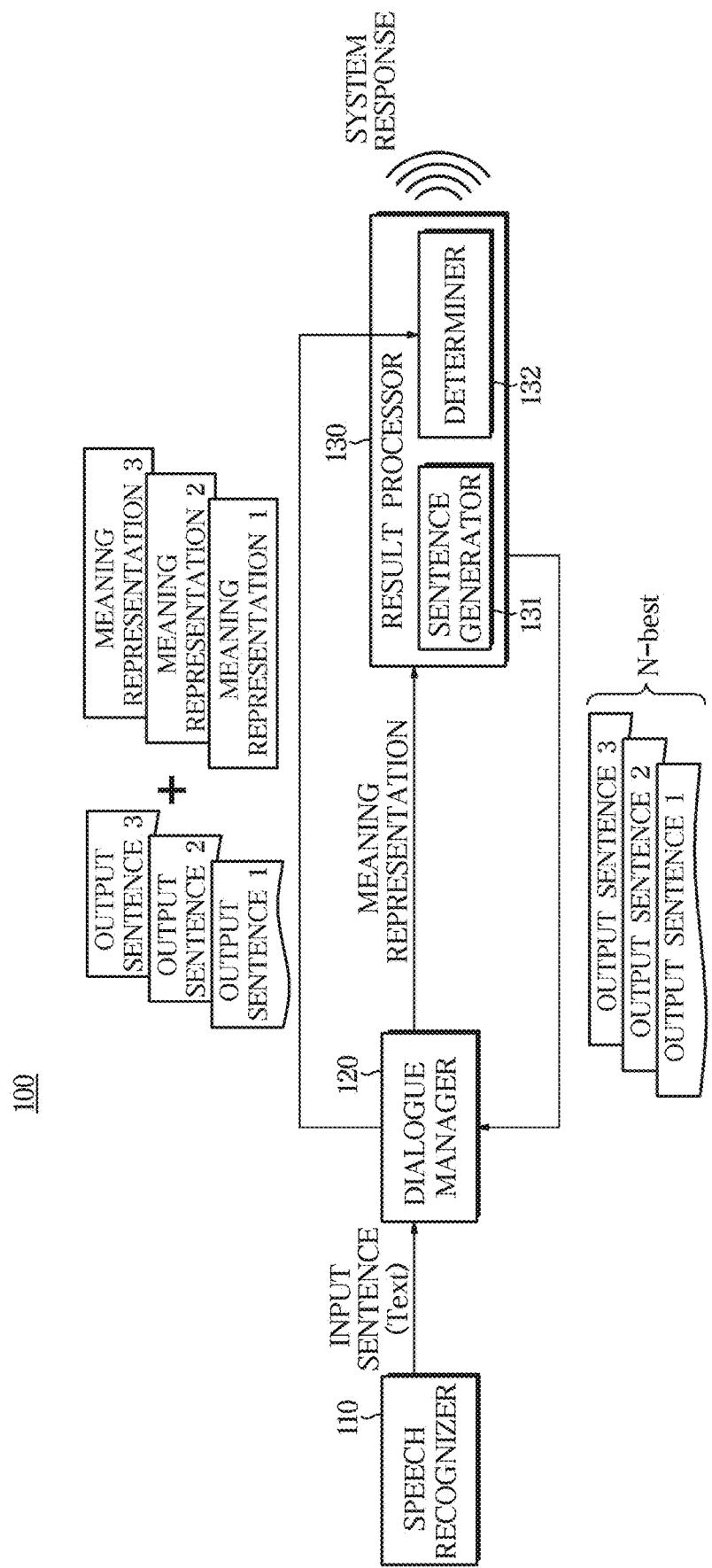
FIG. 2 is a diagram illustrating an example of a result processor in a dialogue system according to an embodiment.

FIG. 2 is a diagram illustrating a specific example of a result processor in dialogue system according to an embodiment.

Referring to FIG. 2, the result processor 130 of the dialogue system 100 according to an embodiment may include a sentence generator 131 and a determiner 132. The sentence generator 131 and the determiner 132 are also classified based on an operation to be performed. The sentence generator 131 and the determiner 132 may share: a memory or computer-readable medium in which a program containing computer-executable instructions and related data are stored; and a processor that executes the program.

The sentence generator 131 may generate a plurality of output sentences by applying a natural language generation technique to a meaning representation of an input sentence generated by the dialogue manager 120.

The sentence generator 131 may calculate a confidence score for each of the plurality of output sentences using the N-best algorithm and output the N output sentences in the order of the high confidence score. In other words, a plurality of output sentences may be ranked using the N-best algorithm. The confidence score is a measure of how reliable the result is for the natural language generation result and can be expressed as a value between 0 and 1.

As shown in the example of FIG. 2, the sentence generator 131 may output three output sentences in order of high confidence scores. The three output sentences are input to the dialogue manager 120 again.

The dialogue manager 120 may apply a natural language understanding technique to generate a meaning representation for each of the three output sentences. A meaning representation 1 for output sentence 1, a meaning representation 2 for output sentence 2 and a meaning representation 3 for output sentence 3 may be generated and outputted, respectively. The output meaning representations are input to result processor 130.

The determiner 132 of the result processor 130 may reorder the plurality of output sentences based on the similarity degree between the meaning representation of the input sentences and the meaning representation of each of the plurality of output sentences.

As the meaning representation of the input sentence and the meaning representation of the output sentence are similar, the accuracy of the output sentence is improved. Accordingly, the determiner 132 may assign a similarity score to each of the plurality of output sentences based on the similarity degree between the meaning representation of the input sentence and the output sentence. The higher the similarity degree, the higher the similarity score.

The determiner 132 may calculate a sum score obtained by adding up a reliability score and a similarity score for each of the plurality of output sentences and re-determine the ranks of the plurality of output sentences based on the sum score. The ranking may be re-ordered in the order of highest sum score, and finally, the output sentence having the highest sum score may be selected as the system response.

In the control block diagram, only the sentence generator 131 and the determiner 132 are shown in the result processor 130, however, the result processor 130 may have a Text to Speech (TTS) engine for synthesizing the final output sentence output from the determiner 132, and a control signal generator for generating various control signals for providing a service corresponding to the user intention.

According to the above-described operation, the system response output from the result processor 130 may be output as a voice through a speaker provided in the user terminal.

Hereinafter, a specific example of a system response output from the dialogue system 100 according to an embodiment is described below with reference to FIGS. 3-6.

FIGS. 3-6 are diagrams illustrating a detailed process of outputting a system response when a user utterance is input to a dialogue system according to an embodiment.

Figure 3:
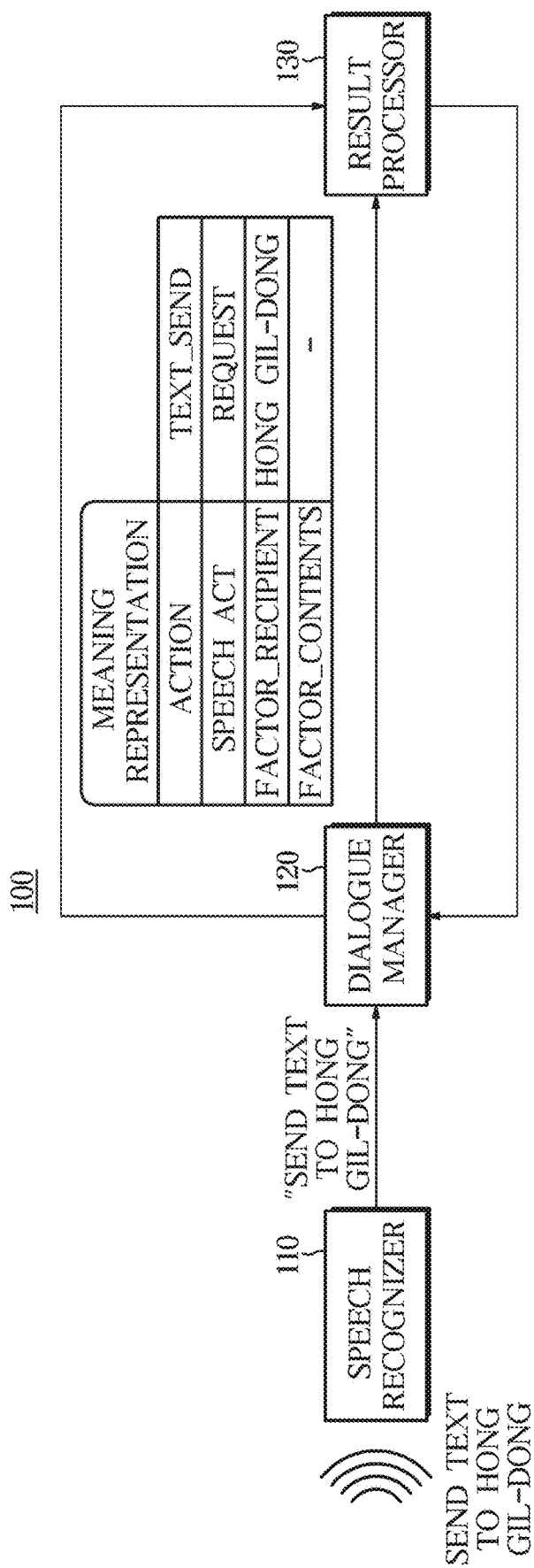
FIGS. 3-6 are diagrams illustrating a detailed process of outputting a system response when a user's utterance is input to a dialogue system according to an embodiment.

Referring to FIG. 3, when the user's speech "Send a text to Hong Gil-dong" is input into the dialogue system 100, the speech recognizer 110 converts the user's speech into text to generate an input sentence.

The input sentence is input to the dialogue manager 120, and the natural language understanding technique may be applied to analyze the meaning of the input sentence "Send a text to Hong Gil-dong" and generate a meaning representation based on the analysis result.

The dialogue manager 120 may determine that: the action of the input sentence "Send a text to Hong Gil-dong" is "Text_Send"; the speech act is "Request", and the factor_recipient is "Hong Gil-dong", The dialogue manager 120 may generate the meaning representation including this information. The generated meaning representation is input to the result processor 130.

Figure 4:
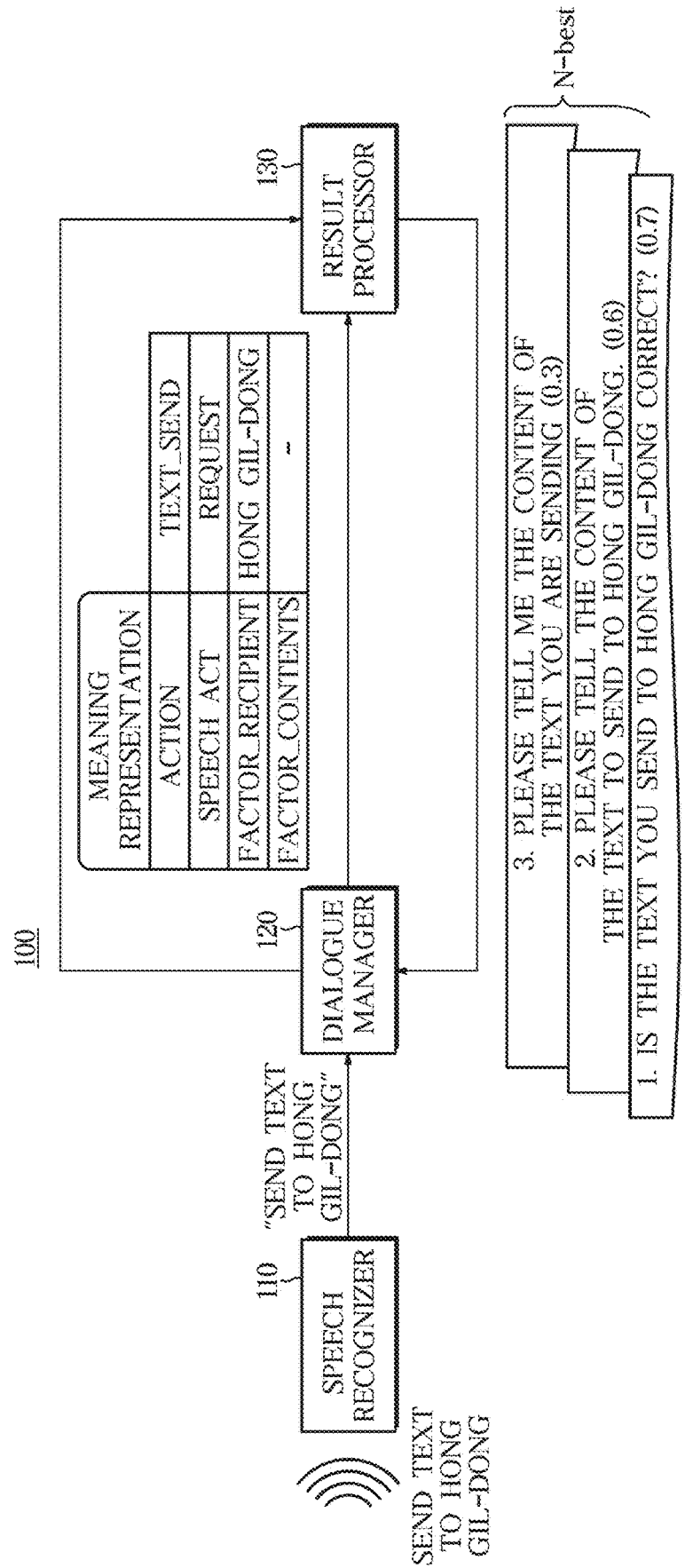

The result processor 130 may generate a plurality of output sentences based on the meaning representation of the input sentences. As described above, the confidence score may be calculated for the plurality of output sentences, and the N output sentences may be ranked in the order of the high confidence score. Referring to FIG. 4, the result processor 130 may generate an output sentence 1: "Is the text you sent to Hong Gil-dong correct?", an output sentence 2: "Please tell the content of the text to send to Hong Gil-dong", and an output sentence 3: "Please tell me the content of the text you are sending" based on the meaning representation of the input sentence. The result processor 130 may rank the three sentences based on the confidence score. In this example, the order is determined in the order of the output sentence 1 (confidence score: 0.7), the output sentence 2 (confidence score: 0.6), and the output sentence 3 (confidence score: 0.3).

A plurality of output sentences generated based on the meaning representation of the input sentences are input to the dialogue manager 120.

The dialogue manager 120 may: analyze a meaning by applying a natural language understanding technique to each of the plurality of output sentences in the same manner as analyzing the meaning of the input sentence; and generate a meaning representation.

Figure 5:
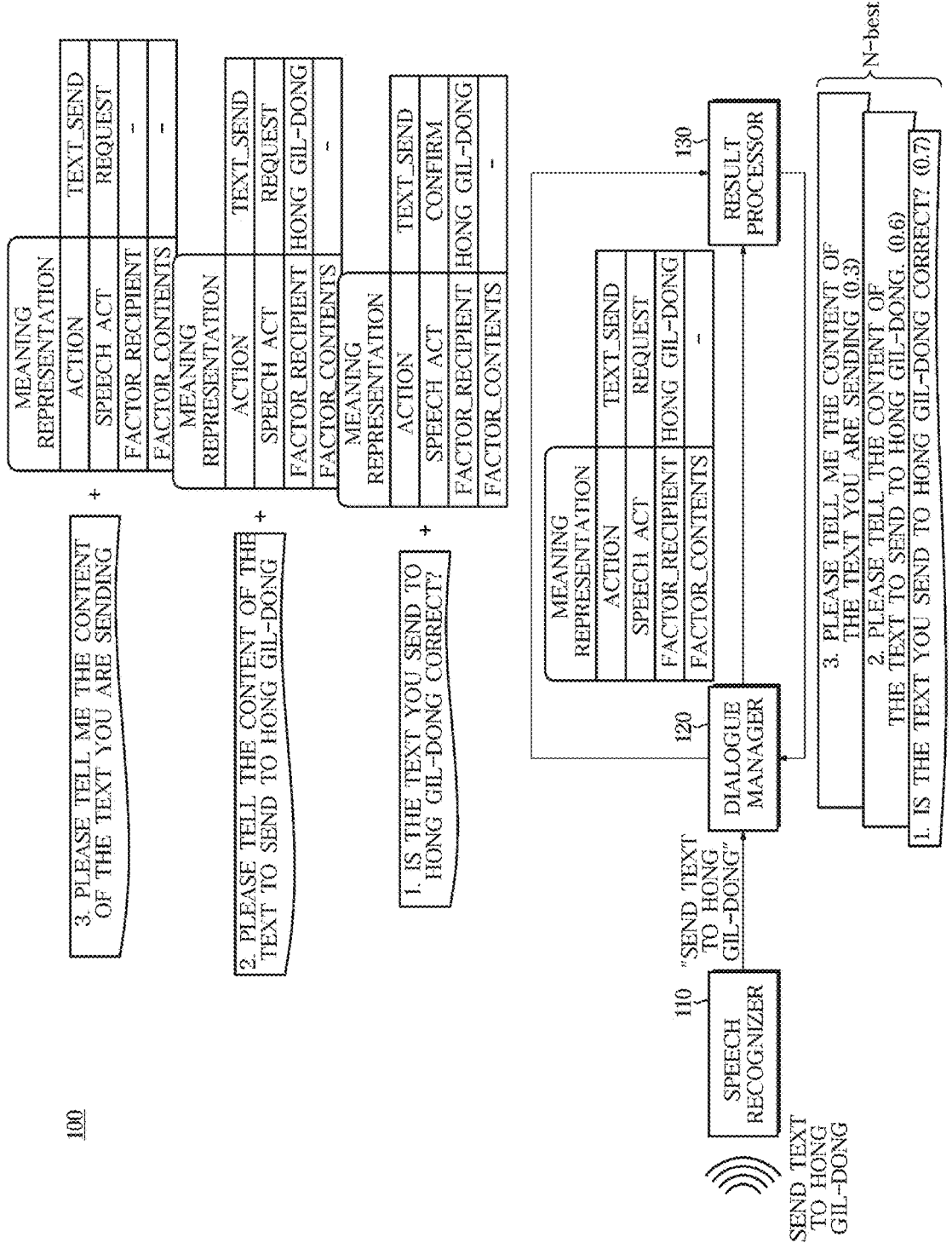

Referring to FIG. 5, as a result of semantic analysis of output sentence can be determined that the action is "text_send", the speech act is "confirm", and the factor_recipient is "Hong Gil-dong", and a meaning representation 1 including this information is generated.

As a result of semantic analysis of output sentence 2, it can be determined that the action is "text_send", the speech act is "request", and the factor_recipient is "Hong Gil-dong", and a meaning representation 2 including this information is generated.

As a result of semantic analysis of output sentence 3, it can be determined that the action is "text_send", the speech act is "request", and a meaning representation 3 including this information is generated.

The meaning representation of each of the plurality of output sentences generated by the dialogue manager 120 is input to the result processor 130.

The result processor 130 may assign a similarity score to each of the plurality of output sentences by comparing the meaning representation of each of the plurality of output sentences with the meaning representation of the input sentence. As described above, the more similar the meaning representation is, the higher the similarity score can be given.

Figure 6:
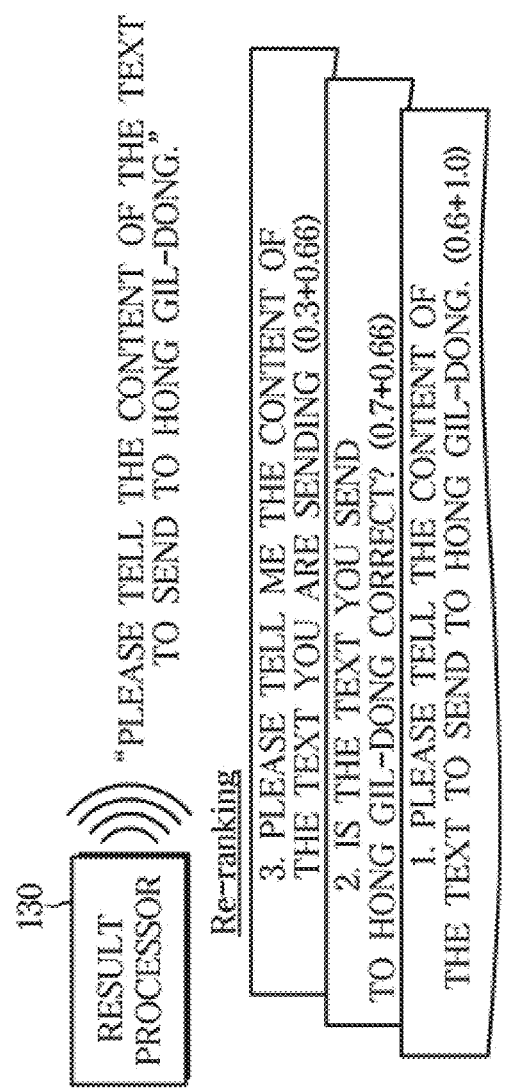

Referring to FIG. 6, based on the comparison result of the meaning representation, the similarity score of the output sentence 1 is 0.66, the similarity score of the output sentence 2 is 1.0, and the similarity score of the output sentence 3 is 0.66.

The result processor 130 may calculate a sum score by summing a confidence score and a similarity score for each of the plurality of output sentences. The sum score of output sentence 1 is 0.7+0.66=1.36. The sum score of output sentence 2 is 0.6+1.0=1.6. The sum score of output sentence 3 is 0.3+0.66=0.96.

The result processor 130 reorders the plurality of output sentences based on the sum score. If the ranking is re-ordered in order of high sum score, the output sentence 2 is ranked first, the output sentence 1 is ranked second, and the output sentence 3 is ranked third.

Therefore, the result processor 130 may convert the output sentence 2 of the 1st priority "Please tell me the content of the text you are sending" into a voice signal and output the result as a system response.

As described above, the higher the similarity between the meaning representation of the input sentence and the meaning representation of the output sentence, the more accurate the output sentence may be. The same principle can be applied to a translating apparatus to improve the accuracy of the translation result. Hereinafter, a translating apparatus according to an embodiment is described below.

Figure 7:
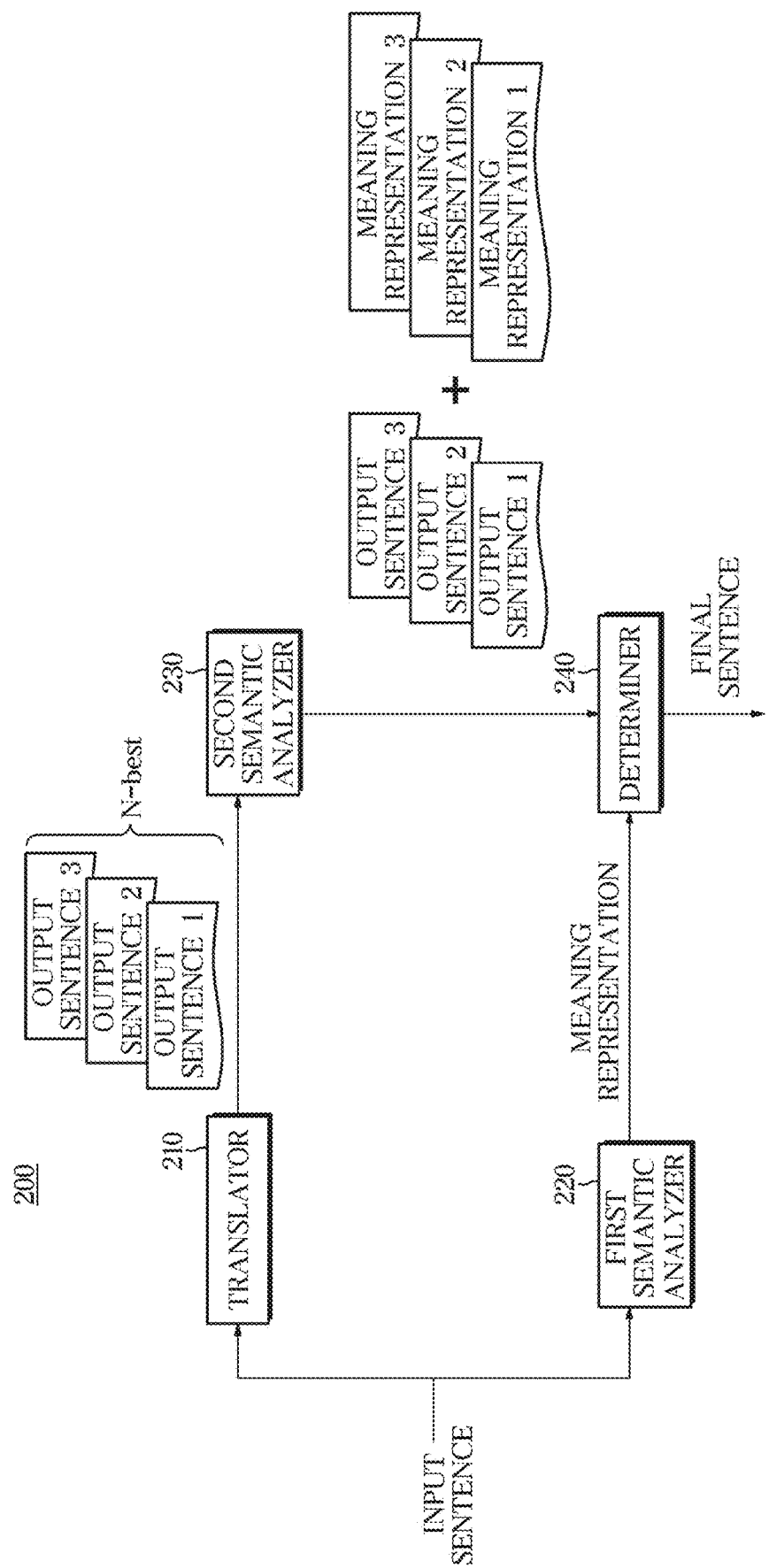
FIG. 7 is a control block diagram of a translating apparatus according to an embodiment.

FIG. 7 is a control block diagram of a translating apparatus according to an embodiment.

Referring to FIG. 7, the translator 200 according to an embodiment may include: a translator 210 for translating an input sentence of a first language into a second language and generating a plurality of output sentences; a first meaning analyzer 220 for generating a meaning representation for the input sentence of the first language; a second meaning analyzer 230 for generating a meaning representation for each of a plurality of output sentences of the second language; and a determiner 240 that determines a final output sentence among the plurality of output sentences of the second language based on the meaning representation of the input sentence of the first language and the meaning representation of the plurality of output sentences of the language. The first meaning analyzer 220 may be referred to as a first semantic analyzer or a first dialogue manager. The second meaning analyzer 230 may be referred to as a second semantic analyzer or a second dialogue manager.

The translating apparatus 200 according to an embodiment may be a device for translating an input sentence into another language by performing machine translation. The user may input the input sentence in the form of a text or may input the form of a voice signal through speech. When inputting in the form of a voice signal, the voice recognizer may convert the voice signal into text and input the same into the translating apparatus 200, or the translating apparatus 200 may include a voice recognizer. In either case, the input sentence input to the translator 210 is assumed to be text.

The translating apparatus 200 according to an embodiment may include: at least one memory or computer-readable medium for storing a program containing computer-executable instructions and related data for performing the operations described below and at least one processor for executing the stored program.

The components in this embodiment are not classified based on physical location or composition, but based on operation, and may include a translator 210, a first meaning analyzer 220, a second meaning analyzer 230, and the like. The determiner 240 may use separate memories and processors, and some or all of them may share the memories and the processors.

The translating apparatus 200 according to an embodiment may be implemented as a server, and in this case, the components 210, 220, 230, and 240 of the translating apparatus 200 may be provided in the server. However, some of the components 210, 220, 230, and 240 of the translating apparatus 200 may be provided in a user terminal connecting the user and the translation apparatus 200.

Alternatively, the user may download and use a program for performing some functions of the components of the dialogue system 100 on the user terminal.

Input devices, such as a microphone, a touch screen, and a keyboard, into which sentences of a first language are input, and output devices such as a display and a speaker, that output sentences translated into a second language, are provided in a user terminal such as a vehicle, a mobile device, or a PC. The user terminal may be connected to the translation apparatus 200 through wireless communication. Although not shown in the control block diagram of FIG. 7, the translating apparatus 200 may further include a wireless communication module that may exchange data with the user terminal through wireless communication.

The translator 210 may generate a plurality of output sentences by translating an input sentence of a first language into a second language using one of various machine translation models. The first language and the second language only need to be different from each other. The types of the first language and the second language may include but are not limited to Korean, English, Chinese, Japanese, Spanish, Portuguese, German, French, and Indian.

When the translator 210 generates a plurality of output sentences, the N-best algorithm may be used. As described above in the embodiment of the dialogue system 100, the translator 210 may rank the plurality of output sentences of the second language. The rank of the plurality of output sentences of the second language may be determined according to the order of the high confidence score.

The first meaning analyzer 220 may apply a natural language understanding technique to an input sentence of the first language to analyze the meaning of the input sentence and generate a meaning representation of the input sentence. The description of the meaning analysis and the meaning representation is as described above in the embodiment of the dialogue system 100.

The second meaning analyzer 230 may analyze a meaning of each of the plurality of output sentences and generate a meaning representation by applying a natural language understanding technique to the plurality of output sentences of the second language.

As illustrated in FIG. 7, when the translator 210 generates the output sentence 1, the output sentence 2, and the output sentence 3, the second meaning analyzer 230 may generate and input the meaning representation 1 for the output sentence 1, the meaning representation 2 for the output sentence 2, and the meaning representation 3 for the output sentence 3 to the determiner 240.

The first meaning analyzer 220 and the second meaning analyzer 230 differ only in the language of the sentence to be analyzed, and they use the same method of analyzing the meaning by applying a natural language understanding technique.

The determiner 240 determines the ranking of the plurality of output sentences of the second language again based on the similarity degree between the meaning representation of the input sentences of the first language and the meaning representation of each of the plurality of output sentences of the second language.

In detail, the determiner 240 may assign a higher similarity score as the similarity degree between the meaning representations increases. The determiner 240 may calculate a sum score obtained by adding the confidence score and the similarity score to each of the plurality of output sentences. The determiner 240 may rank the plurality of output sentences in order of the increasing sum score.

The determiner 240 may determine the output sentence with the highest sum score as the final output sentence. The translating apparatus 200 may output the final output sentence as a translated sentence for the input sentence. The final output sentence may be output as text or may be synthesized into a voice signal and output as a system response.

Hereinafter, an operation of the translating apparatus 200 according to an embodiment is described below in detail with reference to FIGS. 8-10.

Figure 8:
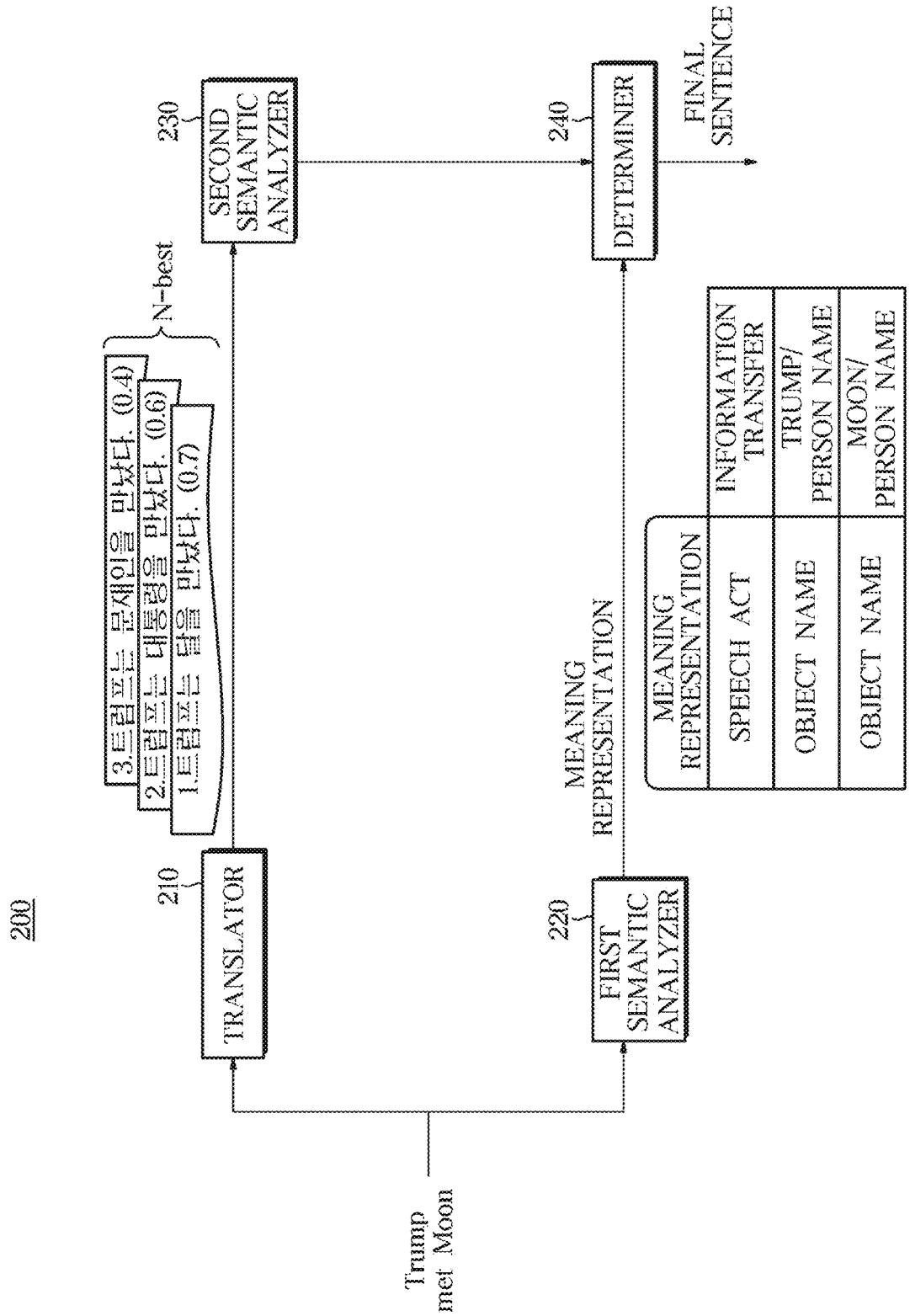
FIGS. 8-10 are diagrams illustrating a specific process of outputting a translated sentence when an input sentence is input to a translating apparatus according to an embodiment.
Figure 9:
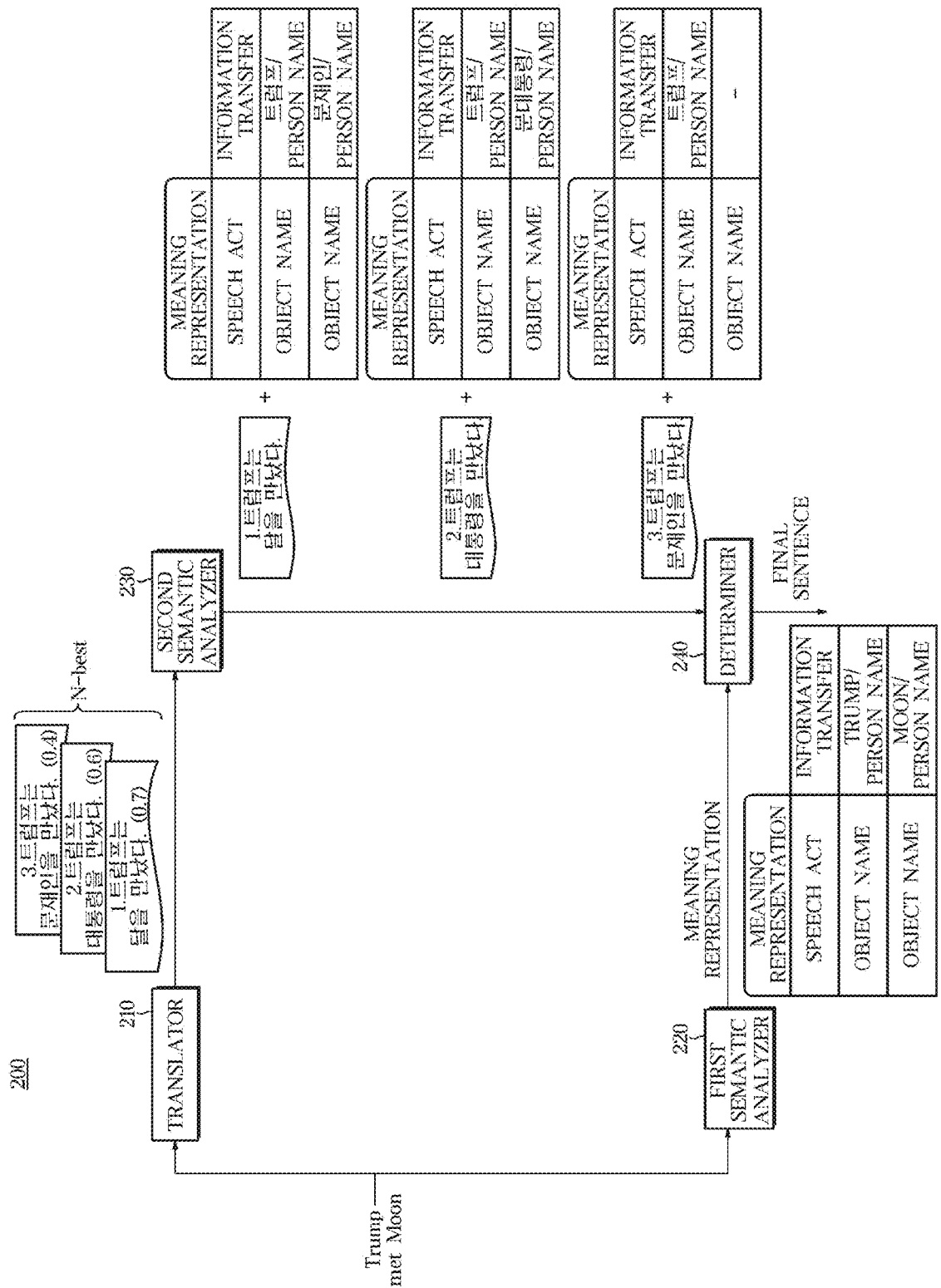
Figure 10:

FIGS. 8-10 are diagrams illustrating a specific process of outputting a translated sentence when an input sentence is input to the translating apparatus 200 according to an embodiment.

In this example, the first language is English and the second language is Korean. As shown in FIG. 8, when the input sentence "Trump met Moon" of the first language is input to the translating apparatus 200, the translator 210 translates the input sentence into Korean, which is the second language, and converts and generates a plurality of output sentences.

For example, you can generate output sentence 1 "트럼프는 달을 만났다" output sentence 2 "트럼프는 문대통령을 만났다", and output sentence 3 "트럼프는 문재인을 만났다".

The translator 210 may assign a confidence score to each of the plurality of output sentences by applying the N-best algorithm. For example, the output score 1 may have a confidence score of 0.7, and the output sentence 2 may have a confidence score of 0,6, and the output sentence 3 may have a confidence score of 0.4.

Therefore, according to the N-best algorithm, the ranks of the plurality of output sentences are in the order of output sentence 1→output sentence 2→output sentence 3.

The output sentence 1, the output sentence 2, and the output sentence 3 may be input to the second meaning analyzer 230. The second meaning analyzer 230 may generate a meaning representation by analyzing the meaning of Korean as the second language.

Referring to FIG. 9, the second meaning analyzer 230 may analyze the meaning of the output sentence 1 to determine that the speech act is "information" and the object name is "트럼프/person name", and it may generate a meaning representation 1 including thereof.

The second meaning analyzer 230 may analyze the meaning of the output sentence 2 to determine that the speech act is "inform" and the object name is "트럼프/person name", "문대통령/person name" and it may generate a meaning representation 2 including thereof.

The second meaning analyzer 230 may analyze the meaning of the output sentence 3 to determine that the speech act is "inform" and the object name is "트럼프/person name", "문대통령/person name" and it may generate a meaning representation 3 including thereof.

The meaning representation for the input sentence and the meaning representation for each of the plurality of output sentences are input to the determiner 240. The determiner 240 compares the meaning representation for the input sentence with the meaning representation for each of the plurality of output sentences to determine the final output sentence.

Referring to FIG. 10, the determiner 240: compares the meaning representation 1 for the input sentence and the meaning representation 1 for the output sentence 1 to calculate a similarity score 0.66; compares the meaning representation of the input sentence with the meaning representation 2 of the output sentence 2 to calculate a similarity score of 1.0; and compares the meaning representation of the input sentence and the meaning representation 3 of the output sentence 3 to calculate a similarity score 1.0.

The determiner 240 may calculate a sum score obtained by adding up a confidence score and a similarity score for each of the plurality of output sentences, and re-determine the ranking based on the sum score.

According to the sum score, the ranking is changed in the order of output sentence 2→output sentence 3→output sentence 1. The determiner 240 may determine and output the output sentence 2 having the highest sum score as the final output sentence.

As such, when the similarity between the meaning representation of the input sentence and the meaning representation of the output sentence in which the input sentence is translated is considered, a translation sentence having a meaning similar to that of the input sentence can be output to the user.

Hereinafter, a dialogue processing method and a translating method according to an embodiment is described below.

In the implementation of the dialogue processing method according to an embodiment, the above-described dialogue system 100 may be used. In the implementation of the translating method according to an embodiment, the above-described translating apparatus 200 may be used. Therefore, the foregoing descriptions of the dialogue system 100 and the translating apparatus 200 may be equally applied to the dialogue processing method and the translating method, unless otherwise noted.

FIG. 11 is a flowchart of a dialogue processing method, according to an embodiment.

According to the dialogue processing method illustrated in FIG. 11, an input sentence is generated by converting user speech into text (310), and a meaning representation of the input sentence is generated (320). The speech recognizer 110 may convert a user's speech into text using a speech recognition algorithm. The dialogue manager 120 may generate a meaning representation of the input sentence using natural language understanding technology.

A plurality of output sentences corresponding to the meaning representation is generated (330). When the meaning representation of the input sentence is input to the result processor 130, the result processor 130 generates a plurality of output sentences corresponding to the meaning representation of the input sentence using the N-best algorithm. The ranking may be determined based on the confidence score of each output sentence.

A meaning representation for each of the plurality of output sentences is generated (340). The plurality of output sentences generated by the result processor 130 are input to the dialogue manager 120. The dialogue manager 120 analyzes the meaning of each of the plurality of output sentences by applying natural language understanding techniques in the same manner as the input sentences and generates a meaning representation.

A system response is generated (350) based on the meaning representation for the input sentence and the meaning representation for each of the plurality of output sentences. The meaning representation of each of the plurality of output sentences is input back to the result processor 130. The result processor 130 may assign a similarity score to each of the plurality of output sentences based on the similarity between the meaning representation of the input sentence and the meaning representation of each of the plurality of output sentences. The higher the similarity degree between meaning representations, the higher the similarity score.

The result processor 130 may calculate a sum score obtained by adding up a confidence score and a similarity score for each of the plurality of output sentences. The result processor 130 may re-determine the ranking according to the sum score. The result processor 130 may determine an output sentence having the highest sum score as a system response.

FIG. 12 is a flowchart of a translating method, according to an embodiment.

According to the translating method of FIG. 12, a plurality of output sentences are generated by translating an input sentence of a first language into a second language (410). When the translator 210 receives an input sentence of the first language, the translator 210 generates a plurality of output sentences of the second language using the N-best algorithm, calculates a confidence score for each output sentence, and determines the rank of the plurality of output sentences based on the confidence score.

A meaning representation of the input sentences of the first language may be generated (420), and a meaning representation of each of the plurality of output sentences of the second language may be generated (430). The first meaning analyzer 220 may analyze a meaning by applying a natural language understanding technique performed by the dialogue system 100 to an input sentence of the first language, and generate a meaning representation. The second meaning analyzer 230 may analyze a meaning and generate a meaning representation by applying a natural language understanding technique performed by the dialogue system 100 to a plurality of output sentences of the second language.

A final output sentence is determined from the plurality of output sentences of the second language based on the meaning representation of the input sentences of the first language and the meaning representation of the plurality of output sentences of the second language (440). The meaning representation of the input sentences of the first language and the meaning representations of each of the plurality of output sentences of the second language are input to the determiner 240. The determiner 240 may re-rank the plurality of output sentences of the second language based on the similarity degree between the meaning representation of the input sentences of the first language and the meaning representation of each of the plurality of output sentences of the second language. The higher the similarity degree with the meaning representation of the input sentence, the higher the similarity score is assigned to the output sentence of the second language, and the sum of the confidence score and the similarity score for each of the plurality of output sentences may be calculated. The determiner 240 may re-determine the ranking of the plurality of output sentences based on the sum score, and the higher the sum score may have a higher rank. The determiner 240 may determine the output sentence having the highest ranking as the final output sentence according to the determined ranking again.

According to the above-described embodiment, the accuracy of the output sentence can be improved by considering the similarity degree between the meaning representation of the input sentence and the meaning representation of the output sentence in generating the output sentence for the input sentence in the dialogue system or the translating apparatus.

As described above, the disclosed embodiments have been described with reference to the accompanying drawings. Those of ordinary skill in the art should understand that the present disclosure can be implemented in a form different from the disclosed embodiments without changing the technical spirit or essential features of the present disclosure. The disclosed embodiments are examples and should not be construed as limiting.

It is an aspect of the disclosure to provide a dialogue system and a dialogue processing method that can improve the accuracy and user convenience of the system response by generating a system response using a semantic analysis model used to analyze the meaning of the user speech.

In addition, it is an aspect of the disclosure to provide a translating apparatus and a translating method that can improve the accuracy of the translation by using a semantic analysis model used to analyze the meaning of the user utterance when selecting the final output sentence from the plurality of output sentences translated from the input language to another language.

DESCRIPTION OF SYMBOLS

100: dialogue system
110: speech recognizer
120: dialogue manager
130: result processor
200: translating apparatus
210: translator
220: first semantic analyzer
230: second semantic analyzer
240: determiner

What is claimed is:

1. A translating apparatus comprising:
a user terminal that communicates with an input device and an output device; and
a processor configured to
convert a voice signal received from the input device via the user terminal to text,
generate an input sentence of a first language corresponding to the converted text,
translate the input sentence of the first language into a second language to generate a plurality of output sentences,
generate a meaning representation for the input sentence of the first language,
generate a meaning representation for each of the plurality of output sentences of the second language,
determine a final output sentence among the plurality of output sentences of the second language based on the meaning representation for the input sentence of the first language and the meaning representation for each of the plurality of output sentences of the second language,
control the user terminal to transmit the final output sentence to the output device,
assign a similarity score for each of the plurality of output sentences of the second language based on a similarity degree between the meaning representation for the input sentence of the first language and the meaning representation for each of the plurality of output sentences of the second language, and
determine the final output sentence based on a sum score that adds the similarity score and a confidence score for each of the plurality of output sentences of the second language,
wherein the input device includes at least one of a microphone, a touch screen, and a keyboard, and
wherein the output device includes at least one of a display and a speaker.

2. The translating apparatus according to claim 1, wherein the processor determines a rank of the plurality of output sentences of the second language using a N-best algorithm.

3. The translating apparatus according to claim 2, wherein the processor determines the rank of the plurality of output sentences again based on the similarity degree between the meaning representation for the input sentence of the first language and the meaning representation for each of the plurality of output sentences of the second language.

4. The translating apparatus according to claim 3, wherein the processor assigns the confidence score to each of the plurality of output sentences of the second language using the N-best algorithm.

5. A translating method comprising:
performing, by a user terminal, communication with an input device and an output device;
converting, by a processor, a voice signal received from the input device via the user terminal to text;
generating, by the processor, an input sentence of a first language corresponding to the converted text;
generating, by the processor, a plurality of output sentences by translating the input sentence of a first language into a second language;
generating, by the processor, a meaning representation for the input sentence of the first language;

generating, by the processor, a meaning representation for each of the plurality of output sentences of the second language;

determining, by by the processor, a final output sentence among the plurality of output sentences of the second language based on the meaning representation for the input sentence of the first language and the meaning representation for each of the plurality of output sentences of the second language, and controlling, by the processor, the user terminal to transmit the final output sentence to the output device, wherein determining, by the processor, the final output sentence comprises
- assigning, by the processor, a similarity score for each of the plurality of output sentences of the second language based on a similarity degree between the meaning representation for the input sentence of the first language and the meaning representation for each of the plurality of output sentences of the second language, and
- determining, by the processor, the final output sentence based on a sum score that adds the similarity score and a confidence score for each of the plurality of output sentences of the second language, wherein the input device includes at least one of a microphone, a touch screen, and a keyboard, and wherein the output device includes at least one of a display and a speaker.

6. The translating method according to claim 5, wherein generating, by the processor, the plurality of output sentences of the second language comprises determining a rank of the plurality of output sentences of the second language using a N-best algorithm.

7. The translating method according to claim 6, wherein determining, by the processor, the final output sentence comprises determining the rank of the plurality of output sentences again based on the similarity degree between the meaning representation for the input sentence of the first language and the meaning representation for each of the plurality of output sentences of the second language.

8. The translating method according to claim 7, wherein generating, by the processor, the plurality of the output sentences of the second language comprises assigning the confidence score to each of the plurality of output sentences of the second language using the N-best algorithm.

* * * * *